(12) United States Patent
Ergen et al.

(10) Patent No.: US 9,084,154 B2
(45) Date of Patent: *Jul. 14, 2015

(54) APPARATUS AND METHOD FOR CONTROLLING TRAFFIC FLOW IN BACKHAUL LINK IN WIRELESS COMMUNICATION NETWORK

(71) Applicant: WiChorus Inc., Santa Clara, CA (US)

(72) Inventors: Mustafa Ergen, Oakland, CA (US); Pawan Uberoy, San Jose, CA (US); Rehan Jalil, San Jose, CA (US)

(73) Assignee: WiChorus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/177,085

(22) Filed: Feb. 10, 2014

(65) Prior Publication Data

US 2014/0153397 A1 Jun. 5, 2014

Related U.S. Application Data

(63) Continuation of application No. 12/205,854, filed on Sep. 6, 2008, now Pat. No. 8,687,482.

(60) Provisional application No. 60/967,938, filed on Sep. 7, 2007.

(51) Int. Cl.
*H04W 28/12* (2009.01)
*H04L 12/54* (2013.01)
*H04L 12/801* (2013.01)
*H04L 12/923* (2013.01)
(Continued)

(52) U.S. Cl.
CPC ........... *H04W 28/12* (2013.01); *H04L 12/5695* (2013.01); *H04L 47/14* (2013.01); *H04L 47/762* (2013.01); *H04L 47/788* (2013.01); *H04L 47/822* (2013.01); *H04L 47/824* (2013.01); *H04W 24/00* (2013.01); *H04W 92/12* (2013.01)

(58) Field of Classification Search
CPC ................. H04W 16/02–16/12; H04W 88/08; H04W 88/12; H04L 47/14; H04L 47/762; H04L 47/822; H04L 47/824
USPC .......... 370/229, 328, 468, 496, 522; 455/446, 455/453, 525, 560, 561
See application file for complete search history.

(56) References Cited

U.S. PATENT DOCUMENTS

5,491,719 A 2/1996 Sellin et al.
5,757,810 A 5/1998 Fall
(Continued)

*Primary Examiner* — Un C Cho
*Assistant Examiner* — Jeremy Costin
(74) *Attorney, Agent, or Firm* — Hamilton, Brook, Smith & Reynolds, P.C.

(57) ABSTRACT

A method, system, and apparatus for controlling traffic flow in one or more backhaul links in a wireless communication network is provided. Each backhaul link of the one or more backhaul links includes a backhaul uplink and a backhaul downlink. The method includes analyzing one or more backhaul uplinks and one or more backhaul downlinks between a controller and one or more Base Transceiver Stations (BTSs). The method further includes communicating one or more messages between the controller and the one or more BTSs. The one or more messages include analysis of one or more analysis of one of the one or more backhaul uplinks and the one or more backhaul downlinks. The method further includes controlling the traffic flow in at least one of the one or more backhaul uplinks and the one or more backhaul downlinks based on the one or more messages.

20 Claims, 6 Drawing Sheets (51) Int. Cl.
*H04L 12/911* (2013.01)
*H04W 24/00* (2009.01)
*H04W 92/12* (2009.01)

(56) References Cited

U.S. PATENT DOCUMENTS

| | | |
|---|---|---|
| 5,959,971 A | 9/1999 | Sakai |
| 5,982,760 A | 11/1999 | Chen |
| 6,678,527 B1 | 1/2004 | Rasanen et al. |
| 6,697,352 B1 | 2/2004 | Ludwig et al. |
| 6,738,624 B1 | 5/2004 | Aksentijevic et al. |
| 6,748,220 B1 | 6/2004 | Chow et al. |
| 6,865,165 B1 | 3/2005 | Huttunen |
| 8,483,142 B2 | 7/2013 | Jalil et al. |
| 8,687,482 B2 | 4/2014 | Ergen et al. |
| 2001/0046839 A1 | 11/2001 | Latva-Aho et al. |
| 2005/0037771 A1 | 2/2005 | Tiedemann et al. |
| 2005/0043035 A1 | 2/2005 | Diesen et al. |
| 2006/0003703 A1 | 1/2006 | Yahagi |
| 2006/0034168 A1 | 2/2006 | Bakker et al. |
| 2006/0045013 A1 | 3/2006 | Vannithamby et al. |
| 2006/0126509 A1 | 6/2006 | Abi-Nassif et al. |
| 2007/0153695 A1* | 7/2007 | Gholmieh et al. ............ 370/235 |
| 2007/0177510 A1 | 8/2007 | Natarajan et al. |
| 2007/0218910 A1 | 9/2007 | Hill et al. |
| 2007/0275760 A1 | 11/2007 | Lundh et al. |
| 2008/0008092 A1 | 1/2008 | Wang et al. |
| 2008/0085722 A1 | 4/2008 | Hirano et al. |
| 2008/0123645 A1 | 5/2008 | Pichna et al. |
| 2008/0159212 A1 | 7/2008 | Zhang et al. |
| 2008/0176575 A1 | 7/2008 | Sutton |
| 2008/0268864 A1 | 10/2008 | Andersson et al. |
| 2009/0067333 A1 | 3/2009 | Ergen et al. |

* cited by examiner

APPARATUS AND METHOD FOR CONTROLLING TRAFFIC FLOW IN BACKHAUL LINK IN WIRELESS COMMUNICATION NETWORK

RELATED APPLICATIONS

This application is a continuation of U.S. application Ser. No. 12/205,854, filed Sep. 6, 2008, now U.S. Pat. No. 8,687, 482, which claims the benefit of U.S. Provisional Application No. 60/967,938, filed on Sep. 7, 2007. The entire teachings of the above applications are incorporated herein by reference.

FIELD OF THE INVENTION

The invention generally relates to a wireless communication network. More specifically, the invention relates to an apparatus and method for controlling a traffic flow in a wireless communication network.

BACKGROUND OF THE INVENTION

In a wireless communication network, a controller communicates with a plurality of Base Transceiver Stations (BTSs) for transferring data packets, such as, Internet Protocol (IP) packets. A BTS of the plurality of BTS communicates with one or more Mobile Stations (MSs). Each MS of the one or more MSs receives the data packets from the BTS. The data packets may be associated with various services provided by the wireless communication network. The services may include, but are not limited to, video distribution, vehicle tracking, e-learning, web browsing and weather monitoring. The data packets are transferred to the MSs through a plurality of communication links present between the controller, the plurality of base stations and the mobile stations.

Typically, a communication link i.e., a backhaul link between the controller and a BTS of the plurality of BTS are susceptible to frequent variations. The variations may include a change in capacity and a change in state of the backhaul link. The change in state of the backhaul link denotes whether the backhaul link is operational or whether the backhaul link has failed. However, the controller and the BTS are unaware of such variations and continue to allow a traffic flow i.e., the transfer of the data packets through the backhaul link. This may result in loss of data packets and under/over utilization of the backhaul link.

Furthermore, the backhaul link is expensive, as the cost incurred while using the backhaul link depends on an amount of the data packets transferred through the backhaul link. Therefore, an increased cost may be incurred while using the backhaul link due to absence of information regarding variations in the backhaul link.

Therefore, there is a need of a method, system, and apparatus to efficiently control a traffic flow in the backhaul link.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to controlling traffic flow in backhaul link wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the invention provide apparatuses, methods, and systems for controlling a traffic flow in one or more backhaul links in a wireless communication network. Each backhaul link of the one or more backhaul link includes a backhaul uplink and a backhaul downlink. The method includes analyzing one or more backhaul uplinks and one or more backhaul downlinks between a controller and one or more Base Transceiver Stations (BTSs). The method further includes communicating one or more messages between the controller and the one or more BTSs. The one or more messages include analysis of one of the one or more backhaul uplinks and the one or more backhaul downlinks. The method further includes controlling the traffic flow in at least one of the one or more backhaul uplinks and the one or more backhaul downlinks based on the one or more messages.

Figure 1:
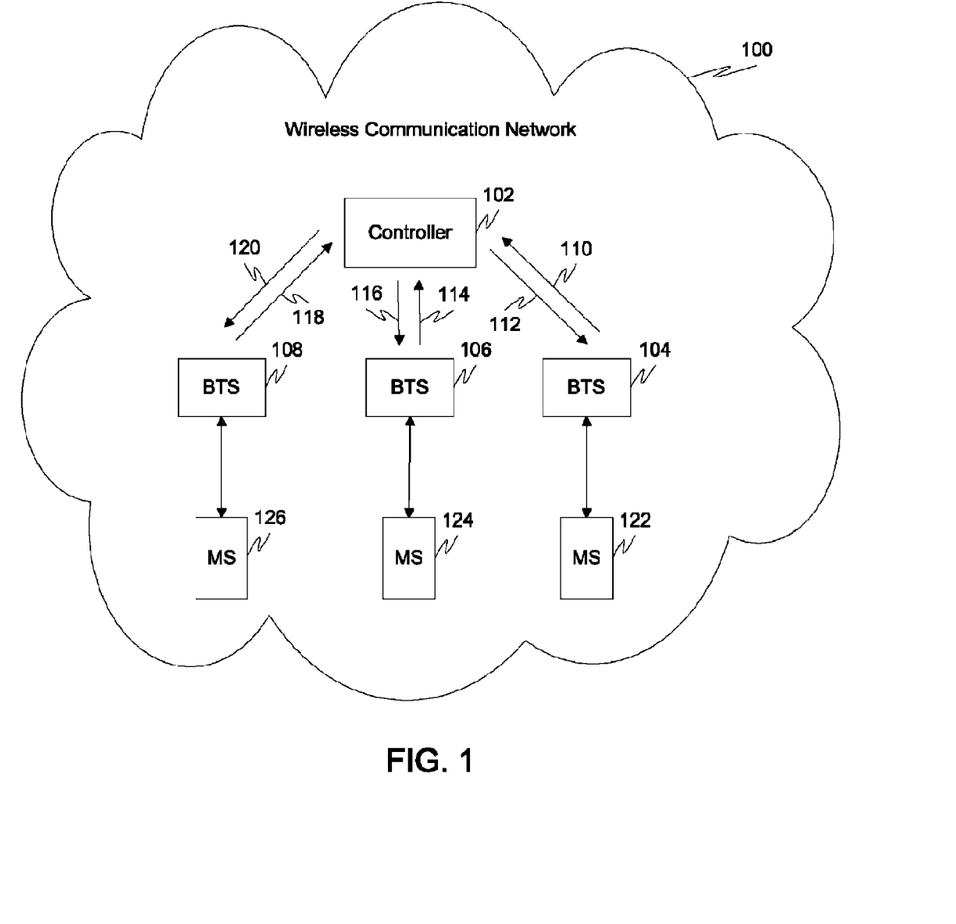
FIG. 1 is a block diagram showing a wireless communication network in which various embodiments of the invention may function.

FIG. 1 is block diagram showing a wireless communication network 100 in which various embodiments of the invention may function. Examples of wireless communication network 100 may include, but are not limited to, a Wireless Interoperability Microwave Access (WiMAX) communication network, a 3rd Generation Partnership Project (3GPP) Long Term Evolution (LTE) network, a 3rd Generation Partnership Project 2 (3GPP2) Ultra Mobile Broadband (UMB) network, a Wireless Fidelity (WiFi) network, and any variant of an Orthogonal Frequency Division Multiple Access (OFDMA) communication network having a backhaul link.

Wireless communication network 100 includes a controller 102 and a plurality of Base Transceiver Station (BTSs) (for example, a BTS 104, a BTS 106, and a BTS 108). It will be apparent to a person skilled in the art that wireless communication network 100 may include more than one controller. Controller 102 communicates with the plurality of BTSs to perform various services in wireless communication network 100. Examples of the services may include, but are not limited to video distribution, vehicle tracking, e-learning, web browsing, and weather monitoring. In case, wireless communication network 100 is a WiMAX communication network, controller 102 is an Access Service Network (ASN)-controller. Further, each BTS of the plurality of BTSs may be one of, but is not limited to, a PICO BTS and a FEMTO BTS.

Controller 102 communicates with each BTS of the plurality of BTSs through a backhaul link. A backhaul link may include a backhaul uplink and a backhaul downlink. A backhaul uplink enables a BTS to send data packets and requests to controller 102 for availing various services. Similarly, a backhaul downlink enables controller 102 to send data packets and requests to a BTS. For example, controller 102 communicates with BTS 104 over a backhaul uplink 110 and a backhaul downlink 112. Similarly, a backhaul uplink 114 and a backhaul downlink 116 communicably links controller 102 with BTS 106. Further, a backhaul uplink 118 and a backhaul downlink 120 communicably links controller 102 with BTS 108.

Further, the plurality of BTSs communicates with a plurality of Mobile Stations (MSs). For example, BTS 104 communicates with a MS 122, BTS 106 communicates with a MS 124, and BTS 108 communicates with MS 126 to provide the various services in wireless communication network 100. Examples of a MS may include, but are not limited to a laptop computer, a personal digital assistant (PDA), a mobile phone, and any hand-held devices using which a subscriber avails the various services.

Figure 2:
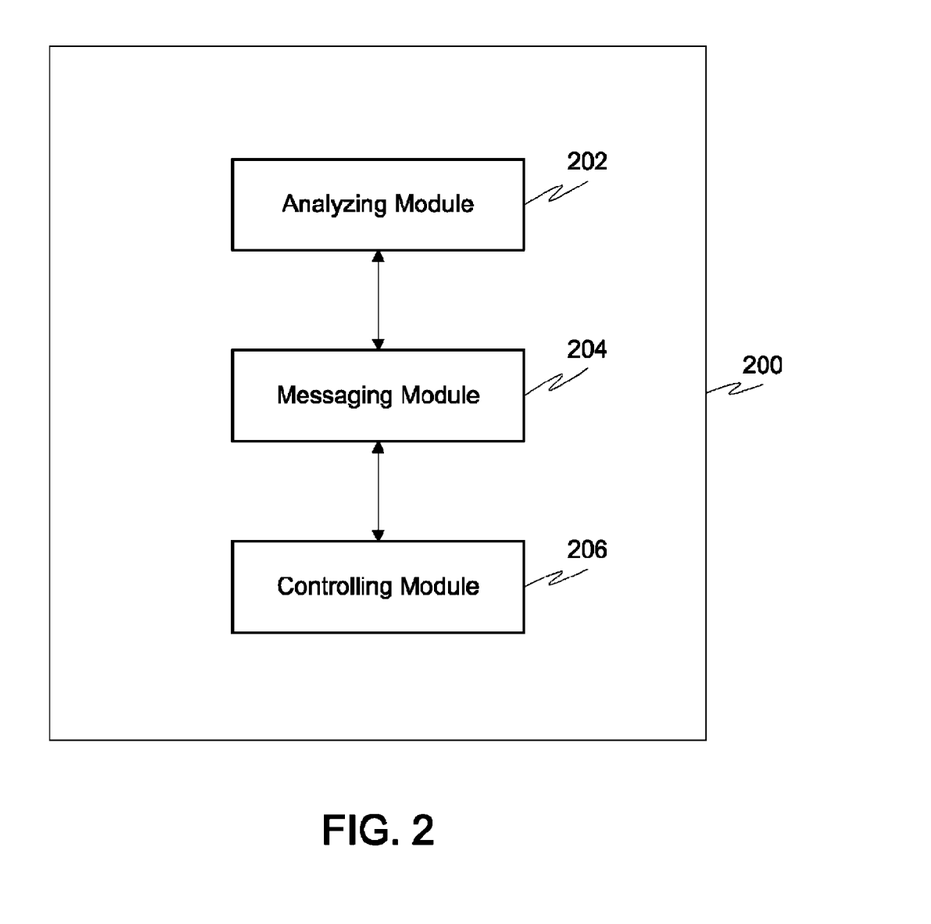
FIG. 2 is a block diagram showing a system for controlling communication in a wireless communication network, in accordance with an embodiment of the invention.

FIG. 2 is a block diagram showing a system 200 for controlling communication in wireless communication network 100, in accordance with an embodiment of the invention. In an embodiment, wireless communication network 100 may be an ASN and accordingly system 200 may be located in the ASN.

System 200 includes an analyzing module 202, a messaging module 204 and a controlling module 206. It will be apparent to a person skilled in the art that system 200 is shown to include a single analyzing module 202, messaging module 204 and controlling module 206 for purpose of description. However, system 200 may include more than one analyzing module, messaging module, and controlling module.

In an embodiment of the invention, analyzing module 202 and messaging module 204 may be located in a controller and controlling module 206 may be located in one or more BTSs communicating with the controller. In another embodiment of the invention, analyzing module 202 and messaging module 204 may be located in each of the one or more BTSs and controlling module 206 may be located in the controller. It will be apparent to a person skilled in the art that any other network entity in wireless communication network 100 may include one or more of analyzing module 202, messaging module 204, and controlling module 206.

Analyzing module 202 is configured to analyze one or more backhaul uplinks and one or more backhaul downlinks between controller and one or more BTSs of a plurality of BTSs. Thereafter, analyzing module 202 generates an analysis of the one or more backhaul uplinks and the one or more backhaul downlinks. For example, analyzing module 202 analyzes backhaul uplink 110 and backhaul downlink 112 between controller 102 and BTS 104. Thereafter, analyzing module 202 generates an analysis of backhaul uplink 110 and backhaul downlink 112.

The analysis of a backhaul uplink of the one or more backhaul uplinks may include information corresponding to a variation in a capacity of the backhaul uplink from a predefined uplink capacity. The capacity of the backhaul uplink may indicate a bandwidth associated with the backhaul uplink. The predefined uplink capacity denotes a capacity initially allocated to the backhaul uplink by a network technician. Similarly, the analysis of the backhaul downlink may include information corresponding to a variation in a capacity of the backhaul downlink from a predefined downlink capacity. The predefined downlink capacity may indicate a capacity initially allocated to the backhaul downlink by the network technician. The capacity of the backhaul downlink may denote a bandwidth associated with the backhaul downlink.

Additionally, the analysis of the backhaul uplink may include an indication of a failure of the backhaul uplink. Similarly, the analysis associated with the backhaul downlink may include an indication of a failure of the backhaul downlink. The failure of the backhaul uplink and the backhaul downlink denotes an interruption in the backhaul uplink and the backhaul downlink. Such interruptions may lead to loss of data packets transmitted through the backhaul uplink and the backhaul downlink. Further, a backhaul uplink and a backhaul downlink may include multiple hop links. In this case, a failure may be caused if one of the multiple hop links breaks.

Thereafter, analyzing module 202 sends the analysis of the one or more backhaul uplinks and the one or more backhaul downlinks to messaging module 204. Messaging module 204 communicates one or more messages between controller 102 and the one or more BTSs based on the analysis received from analyzing module 202. A message of the one or more messages may include one of the analysis associated with a backhaul uplink of the one or more backhaul uplinks and the analysis associated with a backhaul downlink of the one or more backhaul downlinks. For example, messaging module 204 receives the analysis of backhaul uplink 110 and the analysis of the backhaul downlink 112 between controller 102 and BTS 104 and examines the analysis. Based on the examination, messaging module 204 generates one or more messages. A message of the one or more messages may include an analysis associated with one of backhaul uplink 110 and backhaul downlink 112. Thereafter, messaging module 204 sends the one or more messages to controlling module 206. A format of the one or more messages is further explained in conjunction with FIG. 4.

Based on the one or more messages, controlling module 206 controls the traffic flow in at least one of the one or more backhaul uplinks and the one or more backhaul downlinks. For example, a message of the one or more messages received by controlling module 206 may include an analysis of backhaul uplink 110 between controller 102 and BTS 104. In such a case, controlling module 206 may control a traffic flow in backhaul uplink 110. Similarly, controlling module 206 may control a traffic flow in backhaul downlink 112 between controller 102 and BTS 104 in response to receiving a message that includes an analysis of backhaul downlink 112 from messaging module 204. A process of controlling the traffic flow in the backhaul uplink and the backhaul downlink is further explained in conjunction with FIG. 4.

Therefore, by performing such an analysis process, the traffic flow through the one or more backhaul uplinks and the one or more backhaul downlinks is continuously monitored thereby preventing any traffic congestion and loss of data packets. Further, the one or more backhaul uplinks and the one or more backhaul downlinks also reduces unnecessary cost involved in transmitting the data packets that are finally lost due to the failure in the one or more backhaul uplinks and the one or more backhaul downlinks.

Figure 3:
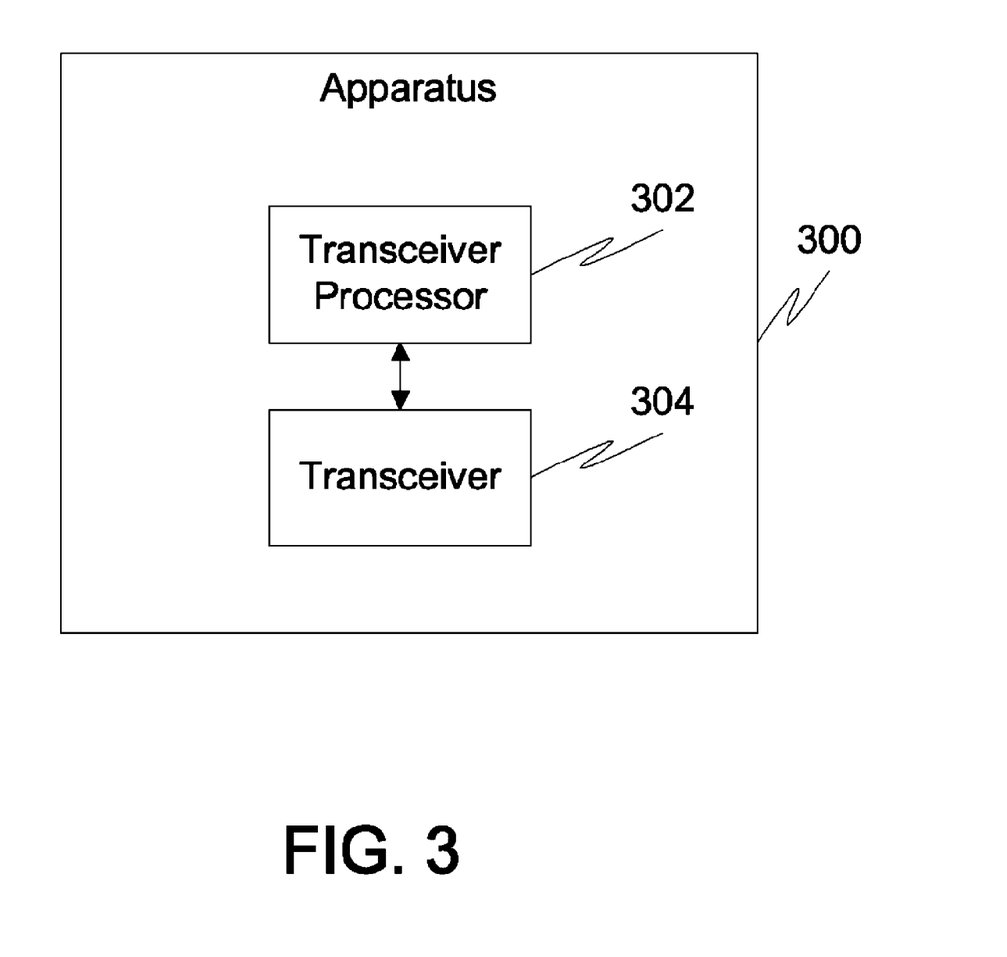
FIG. 3 is a block diagram showing an apparatus for controlling communication in a wireless communication network, in accordance with an embodiment of the invention.

FIG. 3 is a block diagram showing an apparatus 300 for controlling communication in wireless communication network 100, in accordance with an embodiment of the invention. Apparatus 300 includes a transceiver processor 302 and a transceiver 304. In an embodiment of the invention, apparatus 300 is a controller, such as, controller 102 communicably coupled with a plurality of BTSs, such as, BTS 104, BTS 106 and BTS 108. Thus, transceiver processor 302 analyzes one or more backhaul uplinks of one or more BTS of the plurality of BTSs. For example, transceiver processor 302 may analyze backhaul uplink 110 to generate an analysis of backhaul uplink 110. Similarly, transceiver processor 302 may generate analysis for backhaul uplink 114 and backhaul uplink 118. The generation of the analysis and contents of the analysis has been explained in detail in conjunction with FIG. 2.

Thereafter, transceiver processor 302 generates one or more uplink messages in response to analyzing the one or more backhaul uplinks. The one or more uplink messages include one or more analysis of the one or more backhaul uplinks. Thereafter, the transceiver 304 transmits the one or more uplink messages to the one or more BTSs. Thereafter, the one or more BTS control the flow of packets in the one or more backhaul uplinks based on the one or more uplink messages. For example, transceiver 304 transmits one or more uplink messages associated with the analysis of backhaul uplink 110 to BTS 104. Thereafter, BTS 104 controls the flow of traffic in backhaul uplink.

Such a feedback mechanism enables apparatus 300 to identify traffic congestions in the one or more backhaul uplinks in a regular manner. As a result, efficient control of the traffic flow in the one or more backhaul uplinks may be achieved.

Additionally, apparatus 300 receives one or more downlink messages from the one or more BTSs. The one or more downlink messages include one or more analysis of one or more backhaul downlinks of apparatus 300. Based on the one or more downlink messages, transceiver processor 302 controls traffic flow in the one or more backhaul downlinks. This is further explained in conjunction with FIG. 4.

Figure 4:
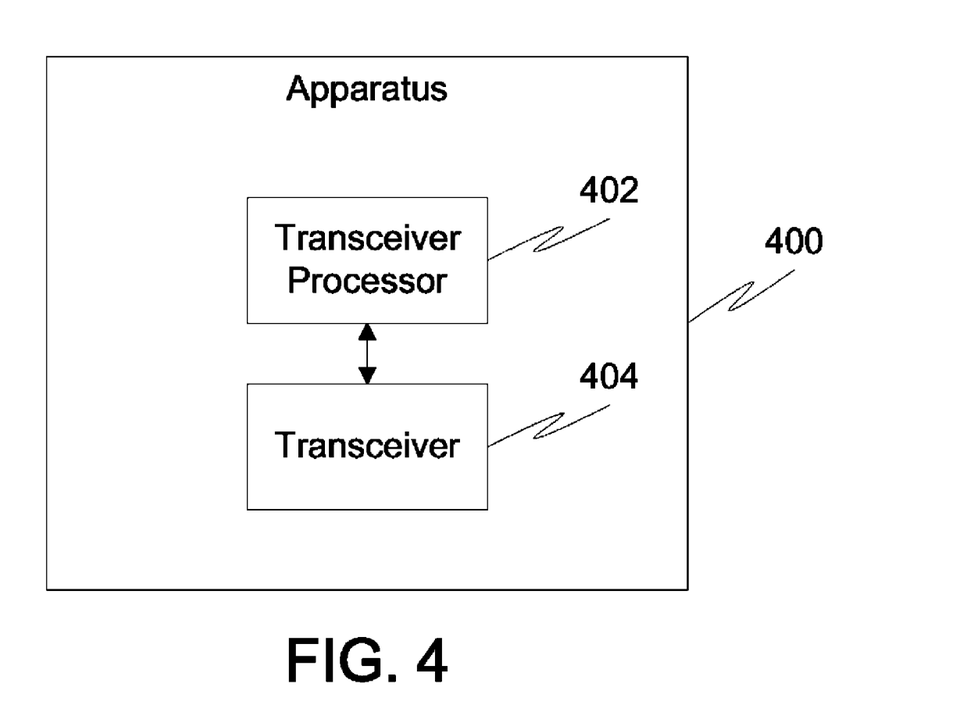
FIG. 4 is a block diagram showing an apparatus for controlling communication in a wireless communication network, in accordance with another embodiment of the invention.

FIG. 4 is a block diagram showing an apparatus 400 for controlling communication in wireless communication network 100, in accordance with another embodiment of the invention. Apparatus 400 includes a transceiver processor 402 and a transceiver 404. In an embodiment of the invention, apparatus 400 is a BTS. The BTS may be one of the plurality of BTSs, such as, BTS 104, BTS 106, and BTS 108. Transceiver processor 402 analyzes a backhaul downlink of a controller. For example, transceiver processor 402 may analyze backhaul downlink 112 that exists between controller 102 and BTS 104 to generate an analysis of backhaul downlink 112. The generation of the analysis and contents of the analysis has been explained in detail in conjunction with FIG. 2.

Thereafter, transceiver processor 402 generates one or more downlink messages in response to analyzing the backhaul downlink. The one or more downlink messages include one or more analysis of the backhaul downlink. Thereafter, transceiver 404 transmits the one or more downlink messages to the controller. Thereafter, the controller controls the flow of packets in the backhaul downlink based on the one or more downlink messages. For example, transceiver 404 transmits one or more downlink messages associated with the analysis of backhaul downlink 112 to apparatus 300, may be a controller.

Such a feedback mechanism enables apparatus 400 to identify traffic congestions or failures in the backhaul downlink in a regular manner. As a result, efficient control of the traffic flow in the backhaul downlink may be achieved.

Additionally, apparatus 400 receives one or more uplink messages from the controller. The one or more uplink messages include one or more analysis of a backhaul uplink of the controller. Based on the one or more uplink messages, transceiver processor 402 controls traffic flow in the backhaul uplink.

Figure 5:
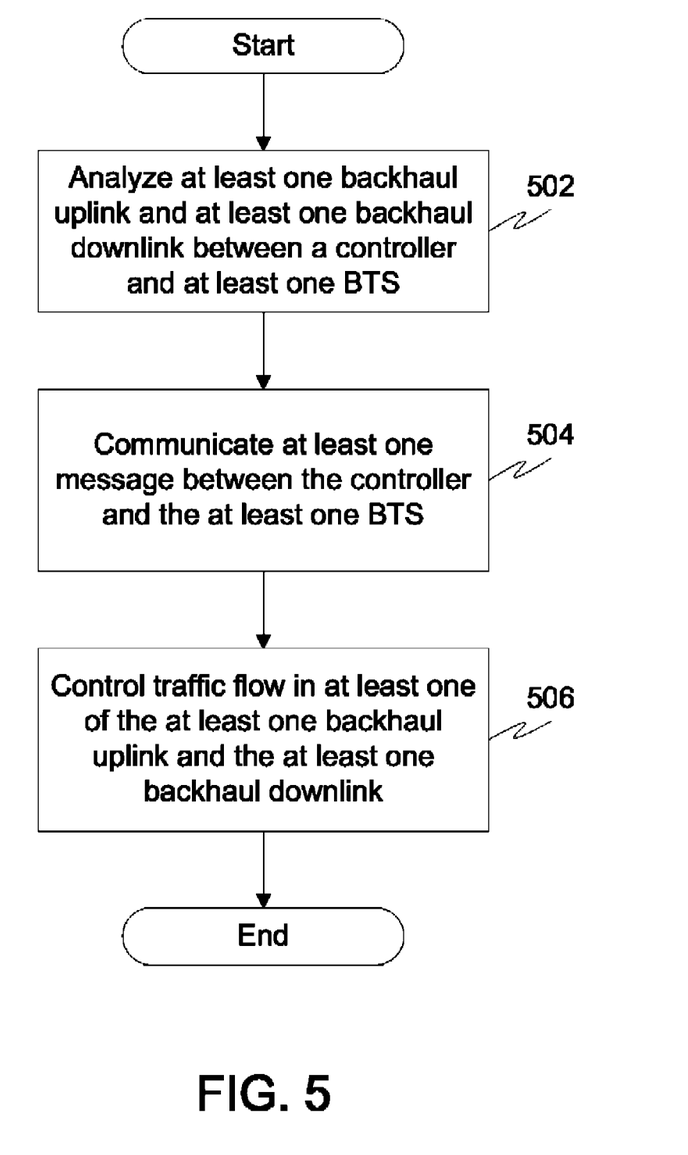
FIG. 5 is a flowchart of a method for controlling traffic flow in a wireless communication network, in accordance with an embodiment of the invention.

FIG. 5 is a flowchart of a method for controlling traffic flow in wireless communication network 100, in accordance with an embodiment of the invention. At step 502, one or more backhaul uplinks and one or more backhaul downlinks between a controller and one or more BTSs are analyzed. For example, transceiver processor 302 of apparatus 300 analyzes the one or more backhaul uplinks of the one or more BTSs, such as, BTS 104, BTS 106 and BTS 108. In this case, apparatus 300 is a controller. In response to analyzing, transceiver processor 302 generates one or more analysis of the one or more backhaul uplinks. Based on the one or more analysis, transceiver processor 302 generates one or more messages. The one or more messages may include the one or more analysis of the one or more backhaul uplinks. Further, transceiver processor 402 of apparatus 400 analyzes a backhaul downlink of the one or more backhaul downlinks and generates one or more analysis of the backhaul downlink. In such a case, apparatus 400 is one of the one or more BTSs, such as, BTS 104, BTS 106 and BTS 108. Thereafter, transceiver processor 402 generates one or more messages based on the analysis of the backhaul downlink. The one or more messages may include one or more analysis of the backhaul downlink.

Subsequently, at step 504, the one or more messages is communicated between the controller and the one more BTSs. In an embodiment, transceiver 304 of apparatus 300, which is the controller, transmits a message of the one or more messages to apparatus 400, which is a BTS of the one or more BTSs. The message may include an analysis of a backhaul uplink of the one or more backhaul uplinks. Similarly, transceiver 404 of apparatus 400, which is a BTS of the one or more BTSs, transmits a message of the one or more messages to apparatus 300, which is the controller. In this case, the message may include an analysis of a backhaul downlink of the one or more backhaul downlinks. A message may be communicated between the controller and the one or more BTSs periodically after a predefined time interval. The predefined time interval may be set while setting wireless communication network 100 by the network technician.

Each message of the one or more messages may be a spare capacity report. In such a case, for example, the spare capacity report may include, the analysis associated with one of the one or more backhaul uplinks and the one or more backhaul downlinks. Additionally, the spare capacity report, may include, information related to unused capacity of one of the controller and the one or more BTSs. For example, when a spare capacity report includes information related to unused capacity of the controller, the unused capacity of the controller may be utilized to handle more BTSs in addition to the one or more BTSs handled by the controller. Moreover, in this case a BTS may be one of the FEMTO BTS and the PICO BTS.

In another scenario, each message of the one or more messages may be appended with a vendor specific Type/Length/Value (TLV) when communicated between the controller and the one or more BTSs. The vendor specific TLV may act as a unique identification for one of the controller and a BTS of the one or more BTSs. Each message of the one or more messages appended with the vendor specific TLV may be communicated between the controller and the one or more BTSs frequently, i.e., after short duration time intervals.

At step 506, the traffic flow in at least one of the one or more backhaul uplinks and the one or more backhaul downlinks is controlled based on the one or more messages received. In an embodiment, apparatus 400, i.e., a BTS of the one or more BTSs receives a message of the one or more messages from apparatus 300, i.e. the controller. Thereafter, apparatus 400 initially examines the analysis associated with a backhaul uplink of the one or more backhaul uplinks in the message. Thereafter, apparatus 400 controls the traffic flow in the backhaul uplink based on the analysis.

Further, in another case, apparatus 300, i.e., the controller receives a message of the one or more messages received from apparatus 400, i.e. a BTS of the one or more BTSs. Subsequently, apparatus 300 controls the traffic flow in a backhaul downlink of the one or more backhaul downlinks based on the analysis associated with the backhaul downlink. A process of controlling the traffic flow in the one or more backhaul uplinks and the one or more backhaul downlinks has been explained in detail in conjunction with FIG. 2.

Referring back to the case in which a message of the one or more messages is appended with vendor specific TLVs. For example, the message of the one or more messages received by the controller from apparatus 400, i.e., a BTS of the one or more BTS, may be appended with a vendor specific TLV. The vendor specific TLV may act as a unique identification for apparatus 400. Based on the vendor specific TLV, the controller identifies that the message is received from apparatus 400. Further, the vendor specific TLVs appended to messages sent by each BTS of the one or more BTSs enables the controller to identify overall capacities associated with the each BTS of the one or more BTSs. Based on the overall capacities, the controller may control the traffic flow in the one or more downlinks between the one or more BTSs and the controller.

Figure 6:
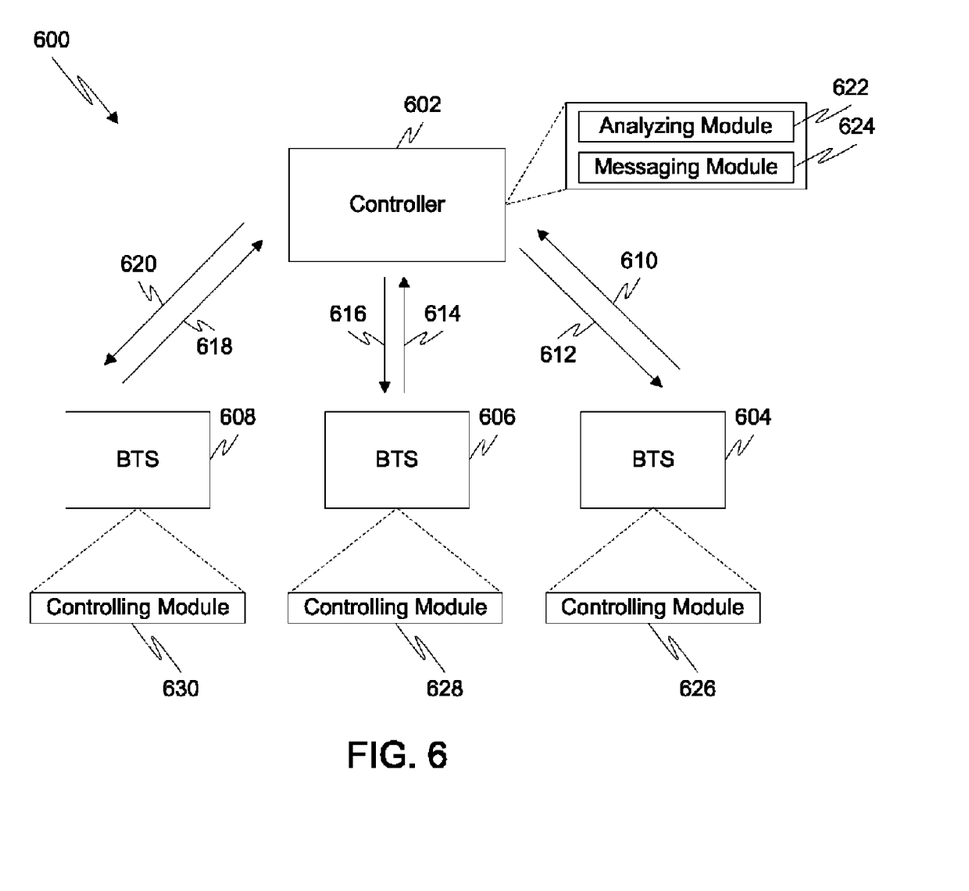
FIG. 6 is a block diagram depicting control of traffic flow in a backhaul uplink in a WiMAX communication network, in accordance with an exemplary embodiment of the invention.

FIG. 6 is a block diagram depicting control of traffic flow in a backhaul uplink in a WiMAX communication network 600, in accordance with an exemplary embodiment of the invention. WiMAX communication network 600 includes an ASN controller 602 communicably linked to a BTS 604, a BTS 606, and a BTS 608. More specifically, ASN controller 602 is communicably linked with BTS 604 through a backhaul uplink 610 and a backhaul downlink 612. Similarly, ASN controller 602 is communicably linked with BTS 606 through a backhaul uplink 614 and a backhaul downlink 616 and with BTS 608 through a backhaul uplink 618 and a backhaul downlink 620.

ASN controller 602 includes an analyzing module 622 and a messaging module 624. Further, BTS 604 includes a controlling module 626, BTS 606 includes a controlling module 628, and BTS 608 includes a controlling module 630. It will be apparent to a person skilled in the art that controlling module 626, controlling module 628, and controlling module 630 are functionally identical to controlling module 206.

Further, analyzing module 622 is functionally identical to analyzing module 202 and messaging module 624 is functionally identical to messaging module 204.

While communicating with BTS 604, analyzing module 622 analyzes backhaul uplink 610. Thereafter, analyzing module 622 generates an analysis of backhaul uplink 610. Analyzing module 622 sends the analysis of backhaul uplink 610 to messaging module 624. Thereafter, messaging module 624 generates one or more messages that include the analysis of backhaul uplink 610. ASN-controller 602 sends the one or more messages to BTS 604. The one or more messages may be sent through backhaul downlink 612 that acts as a feedback channel.

Controlling module 626 located in BTS 604 receives the one more messages. Controlling module 626 gathers the analysis of backhaul uplink 610 from the one or more messages and accordingly controls the traffic flow in backhaul uplink 610. The analysis of backhaul uplink 610 may indicate a variation in a capacity of backhaul uplink 610. For example, the variation in the capacity of backhaul uplink 610 may indicate a reduction in the capacity of backhaul uplink 610 from the predefined uplink capacity. In such a scenario, controlling module 626 may reduce the traffic flow, i.e., reduces an amount of data packets transferred through backhaul uplink 610, thereby precluding over-utilization of backhaul uplink 610 and loss of the data packets.

Alternatively, the variation of the capacity of backhaul uplink 610 may indicate an increase in the capacity of backhaul uplink 610 subsequent to an initial decrease in the capacity. Based on such a variation of the capacity of backhaul uplink 610, controlling module 626 may increase the traffic flow, i.e., increases an amount of data packets transferred through backhaul uplink 610, thereby precluding under-utilization of backhaul uplink 610. By precluding such under-utilization of backhaul uplink 610, backhaul uplink 610 may be efficiently utilized.

Further, the analysis of backhaul uplink 610 may indicate a failure in backhaul uplink 610. In this case, controlling module 626 may discontinue the traffic flow, i.e., transfer of the data packets through backhaul uplink 610, thereby precluding any loss of the data packets over backhaul uplink 610. Further, analyzing backhaul uplink 610 also reduces unnecessary cost involved in transmitting the data packets that are finally lost due to the failure in backhaul uplink 610.

The operation of the exemplary embodiment is described considering an interaction between ASN-controller 602 and BTS 604 for purpose of description. However, it will be apparent to a person skilled in the art that interactions of ASN-controller 602 with BTS 606 and BTS 608 will be similar to the interaction between ASN-controller 602 and BTS 604. Further, controlling module 628 and controlling module 630 are configured to perform similar functions executed by controlling module 626 for controlling a traffic flow in backhaul uplink 614 and backhaul uplink 618 based on analysis of backhaul uplink 614 and backhaul uplink 618 received from messaging module 624. Hence, a description explaining an operation of controlling module 628 and controlling module 630 will thus be omitted.

Various embodiments of the invention provide method, system and apparatus for controlling traffic flow in a wireless communication network. As one or more backhaul uplinks and one or more backhaul downlinks between controller and the one or more BTSs of a plurality of BTSs are frequently analyzed, therefore, any traffic congestion and loss of data packets being transmitted in the one or more backhaul uplinks and the one or more backhaul downlinks is prevented. Additionally, by performing frequent analysis, over-utilization and under-utilization of the one or more backhaul uplinks and the one or more backhaul downlinks is easily detected. As a result, the one or more backhaul uplinks and the one or more backhaul downlinks are efficiently utilized. Moreover, cost associated with transfer of data packets is optimized due to efficient utilization of the one or more backhaul uplinks and the one or more backhaul downlinks. Thus, a service provider can offer efficient services to customers. Further, the service provider can reduce cost incurred in providing such services to the customers.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method of communicating in a wireless communication network, the method comprising:
    communicating at least one message between a controller and at least one Base Transceiver Station (BTS), the at least one message including at least one result of an analysis of at least one backhaul uplink or at least one backhaul downlink between the controller and the at least one BTS; and
    controlling traffic flow in at least one of the at least one backhaul uplink and the at least one backhaul downlink based on the at least one message, the at least one message being appended with information specific to at least one of the controller and the at least one BTS, wherein the information appended is a vendor specific Type/Length/Value (TLV) acting as a unique identifier for the at least one of the controller and the at least one BTS.

2. The method of claim 1, wherein the communicating and controlling are performed in a manner consistent with a protocol according to a Wireless Interoperability Microwave Access (WiMAX) communication network, a Long Term Evolution (LTE) network, an Ultra Mobile Broadband (UMB) network, a Wireless Fidelity (WiFi) network, or an Orthogonal Frequency Division Multiple Access (OFDMA) communication network having the at least one backhaul link.

3. The method of claim 1, further comprising enabling the controller to identify overall capacities associated with the at least one BTS based on the information appended.

4. The method of claim 3, wherein controlling the traffic flow in the at least one backhaul downlink includes controlling the traffic flow based on the overall capacities identified.

5. The method of claim 1, further comprising analyzing the at least one backhaul uplink by:
    determining a variation in a capacity of the at least one backhaul uplink from a predefined uplink capacity, wherein the at least one backhaul uplink is between the controller and a given BTS of the at least one BTS; and
    determining whether a failure of the backhaul uplink has occurred.

6. The method of claim 5, wherein communicating the at least one message is performed by transmitting the at least one message by the controller to the given BTS, the message including a result of the analyzing.

7. The method of claim 6, wherein the given BTS controls an amount of traffic flow in the backhaul uplink based on the at least one message.

8. The method of claim 1, wherein the at least one result of the analysis of a given backhaul downlink of the at least one backhaul downlink includes at least one of:
    a variation in a capacity of the given backhaul downlink from a predefined downlink capacity, wherein the given backhaul downlink is between the controller and a given BTS of the at least one BTS; and
    a failure of the given backhaul downlink.

9. The method of claim 8, wherein a given message of the at least one message is transmitted by the given BTS to the controller, the given message including the at least one result of the analysis of the given backhaul downlink.

10. The method of claim 1, further comprising analyzing, at the controller, the at least one backhaul uplink between the controller and the at least one BTS, and analyzing, at the at least one BTS, the at least one backhaul downlink between the controller and the at least one BTS.

11. The method of claim 1, wherein the at least one result of the analysis of a given backhaul uplink of the at least one backhaul uplink includes:
    determining a variation in bandwidth of the given backhaul uplink from a predefined uplink bandwidth, wherein the at least one backhaul uplink is between the controller and a given BTS of the at least one BTS.

12. The method of claim 1, wherein the at least one result of the analysis of a given backhaul downlink of the at least one backhaul downlink includes:
    determining a variation in bandwidth of the given backhaul downlink from a predefined downlink bandwidth, wherein the given backhaul downlink is between the controller and a given BTS of the at least one BTS.

13. A method of communicating in a wireless communication network, the method comprising:
    analyzing, at a given BTS of the at least one BTS, at least one backhaul downlink between a controller and the given BTS;
    communicating at least one message, from the given BTS to the controller, including at least one result of the analyzing of the at least one backhaul downlink and appended with information specific to the given BTS; and
    causing the controller to control traffic flow in the at least one backhaul downlink based on the at least one result and the information specific to the given BTS, wherein the information appended is a vendor specific Type/Length/Value (TLV) acting as a unique identifier for the given BTS.

14. The method of claim 13, wherein the communicating and controlling are performed in a manner consistent with a protocol according to a Wireless Interoperability Microwave Access (WiMAX) communication network, a Long Term Evolution (LTE) network, an Ultra Mobile Broadband (UMB) network, a Wireless Fidelity (WiFi) network, or an Orthogonal Frequency Division Multiple Access (OFDMA) communication network having a backhaul link.

15. The method of claim 13, wherein the controller is configured to identify overall capacities associated with the given BTS based on the information specific to the given BTS.

16. The method of claim 15, wherein the controller is further configured to control the traffic flow in the at least one backhaul downlink based on the overall capacities identified.

17. The method of claim 13, wherein causing the controller to control the traffic flow includes causing the controller to control an amount of traffic flow in the at least one backhaul downlink based on the information specific to the given BTS.

18. A method of communicating in a wireless communication network, the method comprising:
   analyzing, at a controller, at least one backhaul uplink between the controller and at least one Base Transceiver Station (BTS);
   communicating at least one message, from the controller to the at least one BTS, including at least one result of the analyzing of the at least one backhaul uplink and appended with information specific to the controller; and
   causing the at least one BTS to control traffic flow, at the at least one BTS, in the at least one backhaul uplink, based on the at least one result and the information specific to the controller, wherein the information appended is a vendor specific Type/Length/Value (TLV) acting as a unique identifier for the controller.

19. The method of claim 18, wherein the communicating and controlling are performed in a manner consistent with a protocol according to a Wireless Interoperability Microwave Access (WiMAX) communication network, a Long Term Evolution (LTE) network, an Ultra Mobile Broadband (UMB) network, a Wireless Fidelity (WiFi) network, or an Orthogonal Frequency Division Multiple Access (OFDMA) communication network having a backhaul link.

20. A method of communicating in a wireless communication network, the method comprising:
   communicating at least one message between a controller and at least one Base Transceiver Station (BTS), the at least one message including at least one result of an analysis of at least one backhaul uplink or at least one backhaul downlink between the controller and the at least one BTS; and
   controlling traffic flow in at least one of the at least one backhaul uplink and the at least one backhaul downlink based on the at least one message, the at least one message being appended with information specific to at least one of the controller and the at least one BTS, wherein the at least one result of the analysis of a given backhaul downlink of the at least one backhaul downlink includes a failure of the given backhaul downlink, the controlling of the traffic flow discontinuing the traffic flow through the given backhaul downlink in an event the at least one result of the analysis indicates the failure.

* * * * *